United States Patent [19]
Shirataki et al.

[11] Patent Number: 5,671,836
[45] Date of Patent: Sep. 30, 1997

[54] LUBRICATION SYSTEM FOR ONE-WAY CLUTCH

[75] Inventors: Hirobumi Shirataki; Atsushi Sagae; Toshio Awaji, all of Shizuoka-ken, Japan

[73] Assignee: NSK-Warner K.K., Tokyo, Japan

[21] Appl. No.: 584,400

[22] Filed: Jan. 11, 1996

[30] Foreign Application Priority Data

Jan. 10, 1995  [JP]  Japan .................. 7-031310

[51] Int. Cl.⁶ ............................................. F16D 41/07
[52] U.S. Cl. ............................................. 192/113.32
[58] Field of Search ................ 192/113.32, 45.1, 192/41 A; 184/6.12

[56] References Cited

U.S. PATENT DOCUMENTS

| | | | |
|---|---|---|---|
| 3,175,661 | 3/1965 | Maurer et al. | 192/113.32 X |
| 3,191,732 | 6/1965 | McDowall | 192/45.1 X |
| 5,320,204 | 6/1994 | Riggle et al. | 192/113.32 X |
| 5,474,152 | 12/1995 | Wilkinson et al. | 192/113.32 X |

FOREIGN PATENT DOCUMENTS

| | | | |
|---|---|---|---|
| 2 601 735 | 1/1988 | France | 192/113.32 |
| 1-108423 | 4/1989 | Japan . | |
| 5-73326 | 10/1993 | Japan . | |

*Primary Examiner*—Rodney H. Bonck
*Attorney, Agent, or Firm*—Evenson, McKeown, Edwards & Lenahan, P.L.L.C.

[57] ABSTRACT

A lubrication system is disclosed for a one-way clutch of the type that lubeoil is fed into the one-way clutch by shaft-center oiling or under a centrifugal force. The lubrication system comprises oil grooves and an oilway. The oil grooves are formed in an inner peripheral wall of at least one of end bearings arranged on axially opposite sides of the one-way clutch, respectively, whereby lubeoil is drawn into the one-way clutch through the oil grooves. The oilway, on the other hand, opens through an outer peripheral wall of an associated inner ring in a region where the outer peripheral wall of the inner ring and the inner peripheral wall of said at least one end bearing undergo relative sliding motion. The outer peripheral wall of the inner ring is free of any oilway opening in a region where associated sprags are operatively brought into sliding contact with the outer peripheral wall of the inner ring.

7 Claims, 3 Drawing Sheets

LUBRICATION SYSTEM FOR ONE-WAY CLUTCH

BACKGROUND OF THE INVENTION a) Field of the Invention

This invention relates to a lubrication system for a one-way clutch.

b) Description of the Related Art

Among one-way clutches which can transmit rotating force in only one direction but idle in the opposite direction, so-called sprag one-way clutches are widely used these days in power transmissions. In such a sprag one-way clutch, clutch members such as sprags or the like are arranged between an inner ring and an outer ring and are guided at both side walls thereof by end bearings, respectively, so that the clutch members engage the outer and inner rings upon transmission of rotating force but undergo sliding upon idling.

The fundamental construction of a one-way clutch is illustrated in FIG. 6, in which there are shown an inner ring 10, an outer ring 20, clutch members 30 including sprags and an inner and outer retainers in combination, end bearings 40 arranged on opposite sides of the clutch members 30, an oilway 50 for introducing lubeoil into the clutch, and a stop ring 60.

In a one-way clutch, clutch members repeatedly undergo engagement with an inner and outer rings and sliding due to idling. Substantial heat generation and friction therefore occur unless sufficient lubrication is applied. Further, it is also necessary to feed a lube oil sufficiently to avoid irregular rotation and/or seizure because end bearings are usually sliding bearings.

For this purpose, the one-way clutch is provided at a mounting portion therefor with a special lube-oil passage like the oilway 50 as shown in FIG. 6.

In each of such conventional one-way clutches, the oilway 50 centrally opens as depicted in FIG. 6 so that sprags engage an opening of the oilway 50 or slide on this opening. Stresses are therefore applied from the sprags to an outer peripheral wall of the inner ring 10, centering around the opening of the oilway 50, thereby resulting in the problem that these conventional one-way clutches cannot be used in transmissions which are intended for use in transmitting large torques.

Even if a lube oil passage such as that shown in FIG. 6 is provided, supply of lubeoil into the one-way clutch cannot be performed surely when the inner ring remains stationary although lubeoil can be surely fed into the one-way clutch under centrifugal lubricating action while the inner ring is rotating. In the former case, a large majority of the lube oil does not flow through the oilway 50 in the inner ring 10 but is caused to scatter around the one-way clutch as indicated by arrows F, resulting in the problem that lubrication of the one-way clutch is impaired.

To achieve sufficient lubrication, it is necessary to increase the capacity of an oil pump as a supply source for lubeoil. An increase in the supply of the lube oil, however, leads to greater agitation resistance and viscous resistance due to lubeoil remaining in a larger amount around the one-way clutch, resulting in an increased power loss.

SUMMARY OF THE INVENTION

An object of the present invention is therefore to provide a lubrication system for a one-way clutch, which is free of the above-mentioned problems of the conventional one-way clutches and is usable in a transmission through which large torques are transmitted.

The present inventors found that the above-described object can be achieved by shifting an opening of an oilway to a region where sprags neither engage the opening nor slide on the opening, leading to the completion of the present invention.

In one aspect of the present invention, there is thus provided a lubrication system for a one-way clutch of the type that lubeoil is fed into said one-way clutch by shaft-center oiling or under a centrifugal force, comprising:

oil grooves formed in an inner peripheral wall of at least one of end bearings arranged on axially opposite sides of said one-way clutch, respectively, whereby lubeoil is drawn into said one-way clutch through said oil grooves; and an oilway opening through an outer peripheral wall of an associated inner ring in a region where said outer peripheral wall of said inner ring and said inner peripheral wall of said at least one end bearing undergo relative sliding motion, said outer peripheral wall of said inner ring being free of any oilway opening in a region where associated sprags are operatively brought into sliding contact with said outer peripheral wall of said inner ring.

Owing to the above-described construction of the lubrication system according to the present invention for the one-way clutch, the oilway does not open facing the sprags so that stresses are not centered around the opening of the oilway. The one-way clutch making use of the lubrication system according to the present invention can therefore be used in a transmission through which large torques are transmitted. Further, the provision of the oil grooves in the inner peripheral wall of at least one of the end bearings assures recirculation of lubeoil.

DETAILED DESCRIPTION OF THE INVENTION AND PREFERRED EMBODIMENTS

Figure 1:
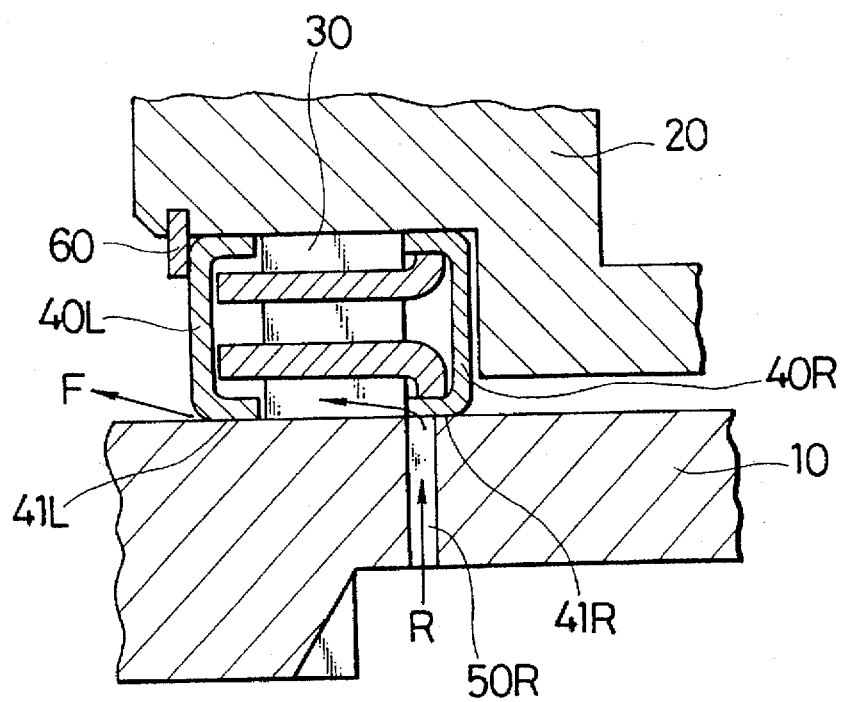
FIG. 1 is a fragmentary cross-sectional side view of a lubrication system according to a first embodiment of the present invention.

Referring first to FIG. 1, the lubrication system according to the first embodiment of the present invention will be described. Clutch members 30 are arranged between an inner ring 10 and an outer ring 20. Also illustrated are a left-side end bearing 40L, a right-side end bearing 40R, and a stop ring 60.

Figure 2:
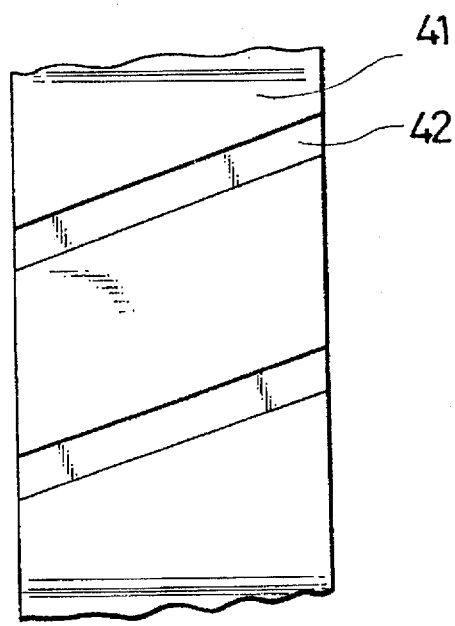
FIG. 2 illustrates one example of oil grooves.

In the first embodiment depicted in FIG. 1, an oilway 50 opens through an outer peripheral wall of the inner ring 10 at a position where an inner peripheral wall 41R of the right-side end bearing 40R and the outer peripheral wall of the inner ring 10 undergo relative sliding motion. In each of an inner peripheral wall 41L of the left-side end bearing 40L and the inner peripheral wall 41R of the right-side end bearing 40R, oil grooves 42 are formed in the same direction as shown in FIG. 2. The direction of the oil grooves 42 is determined so that, upon rotation of the inner ring 10, lubeoil is caused to flow from a right-hand side to a left-hand side, as viewed in FIG. 2, with respect to both the end bearings 40R and 40L. The pattern of the oil grooves 42 can be chosen as desired, for example, can be set in a helical or like pattern.

When the transmission rotates, lubeoil flows inwardly through the oilway 50R and then leftwards through the oil grooves 42 in the inner peripheral wall 41R of the right-side end bearing 40R, as indicated by arrows R, so that the lubeoil enters the one-way clutch. After lubrication and cooling of the inside of the one-way clutch, the lubeoil flows leftwards through the oil grooves 42 in the inner peripheral wall 41L of the left-side end bearing 40L so that the lubeoil is discharged as indicated by arrow F.

Figure 3:
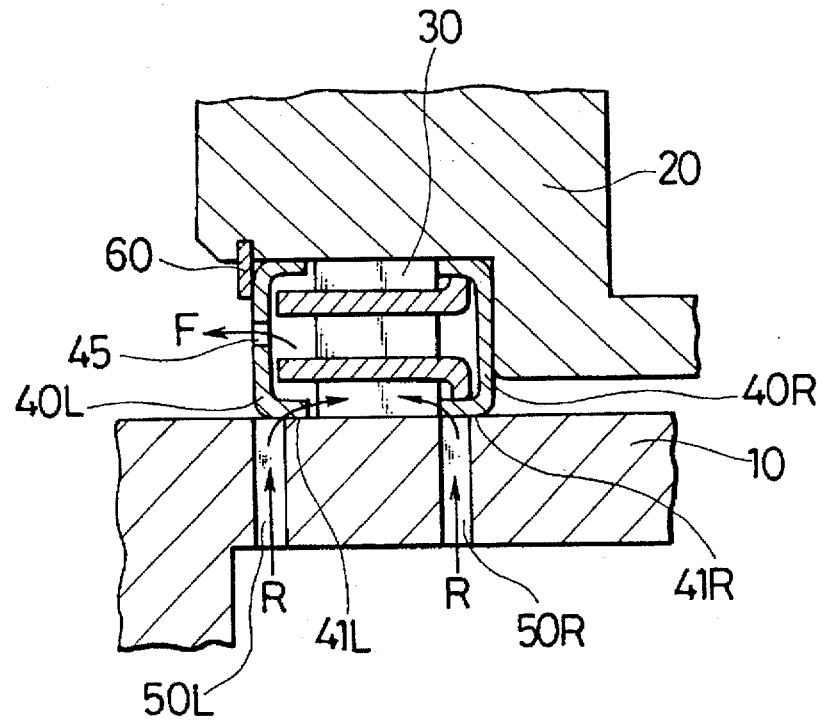
FIG. 3 is a fragmentary cross-sectional side view of a lubrication system according to a second embodiment of the present invention.
Figure 4:
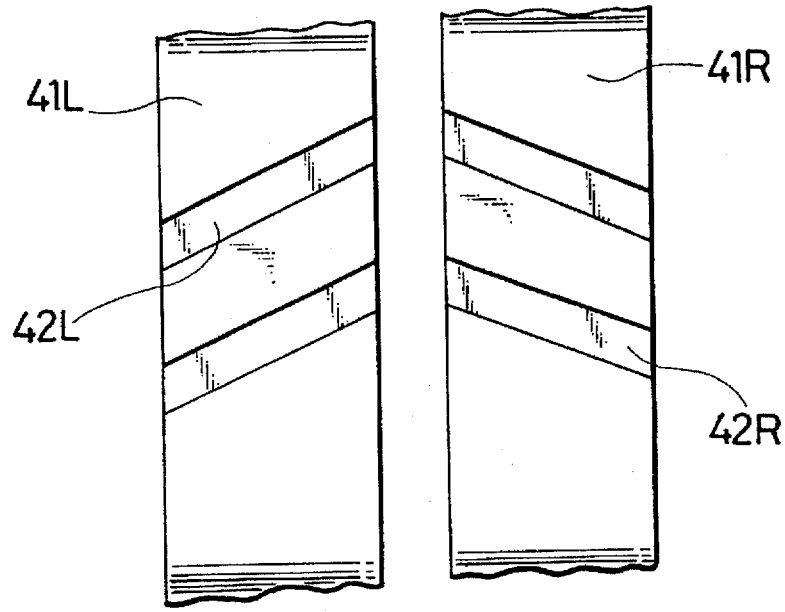
FIG. 4 shows another example of oil grooves.

The second embodiment will next be described with reference to FIG. 3. Through an outer peripheral wall of an inner ring 10, an oilway 50L opens facing an inner peripheral wall 41L of a left-side end bearing 40L and another oilway 50R opens facing an inner peripheral wall 41R of a right-side end bearing 40R. The inner peripheral walls 41L,41R are provided with oil grooves 42L,42R which extend in opposite directions, respectively, as is illustrated in FIG. 4. The directions of these oil grooves 42L,42R are determined so that, upon rotation of the transmission, lubeoil flows from a left-hand side to a right-hand side through the oil grooves 42L but from the right-hand side to left-hand side through the oil grooves 42R.

When the transmission rotates, the lubeoil therefore flows rightwards on the side of the left-side end bearing 40L but leftwards on the side of the right-side end bearing 40R so that the lubeoil flows into the one-way clutch through both the oil grooves 42L,42R. The lubeoil inside the clutch is then discharged, as indicated by arrow F, through an oil discharge hole 45 formed through the left-hand end bearing 40L at an intermediate position, specifically, a midpoint between the inner peripheral wall 41L and an outer peripheral wall of the left-side end bearing 40L.

Figure 5:
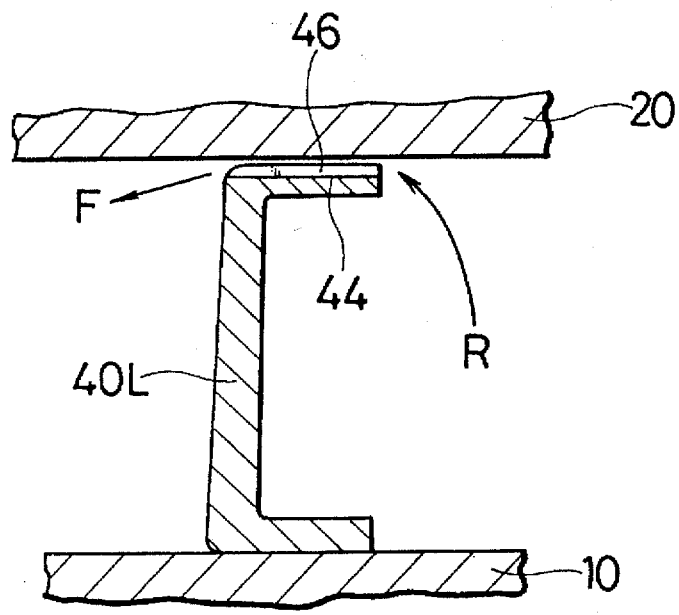
FIG. 5 depicts another example of oil discharging means.
Figure 6:
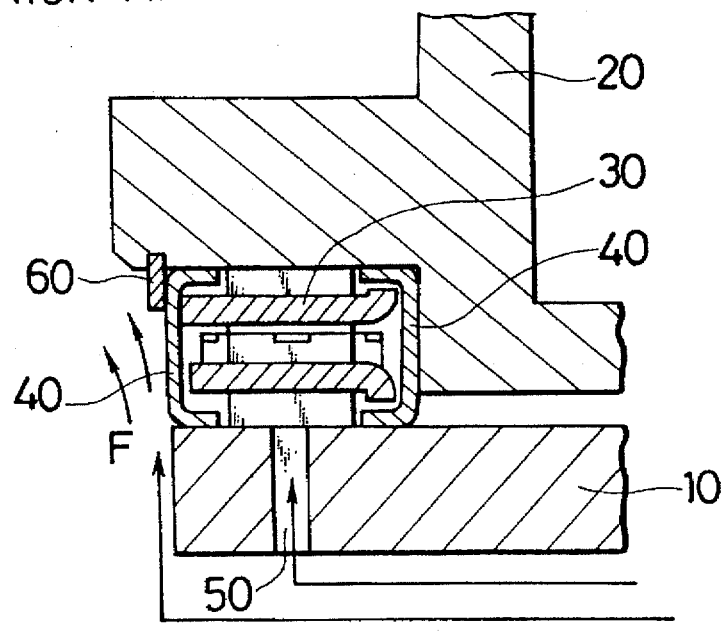
FIG. 6 is a fragmentary cross-sectional side view of a one-way clutch, showing its fundamental construction.

FIG. 5 illustrates another example of oil discharging means. Oil discharge grooves 46 are formed in an outer peripheral wall 44 of an end bearing 40L. Lubeoil is discharged as indicated by arrows R,F.

What is claimed is:

1. A lubrication system for a one-way clutch having an inner ring, an outer ring and end bearings arranged on axially opposite sides, said one-way clutch being of a type wherein lubeoil is fed into said one-way clutch by shaft-center oiling or under a centrifugal force, comprising:

oil grooves formed in an inner peripheral wall of at least one of the end bearings said oil grooves having depths less than corresponding wall thicknesses of the end bearings whereby lubeoil is drawn through said oil grooves for application into said one-way clutch; and an oilway opening through an outer peripheral wall of an associated inner ring in a region where said outer peripheral wall of said inner ring and said inner peripheral wall of said at least one end bearing undergo relative sliding motion, said outer peripheral wall of said inner ring being free of any oilway opening in a region where associated sprags are operatively brought into sliding contact with said outer peripheral wall of said inner ring.

2. The lubrication system according to claim 1, wherein said oil grooves are formed in an inner peripheral wall of only one of said end bearings, and said oilway opens through said outer peripheral wall of said inner ring in a region where said outer peripheral wall of said inner ring and said inner peripheral wall of said one end bearing undergo relative sliding motion.

3. The lubrication system according to claim 2, wherein oil discharge grooves are formed in an inner peripheral wall of the other end bearing.

4. The lubrication system according to claim 2, wherein oil discharge grooves are formed in an outer peripheral wall of the other end bearing.

5. The lubrication system according to claim 1, wherein said oil grooves are formed in an inner peripheral wall of each of said end bearings, a first oilway opens through said outer peripheral wall of said inner ring in a first region where said outer peripheral wall of said inner ring and said inner peripheral wall of one of said end bearings undergo relative sliding motion, and a second oilway opens through said outer peripheral wall of said inner ring in a second region where said outer peripheral wall of said inner ring and said inner peripheral wall of the other end bearing undergo relative sliding motion.

6. The lubrication system according to claim 5, wherein an oil discharge hole is axially formed through said one end bearing at an intermediate position between said inner peripheral wall of said one end bearing and an outer peripheral wall of said one end bearing.

7. The lubrication system according to claim 5, wherein oil discharge grooves are formed in an outer peripheral wall of one of said end bearings.

* * * * *